Figure 1:
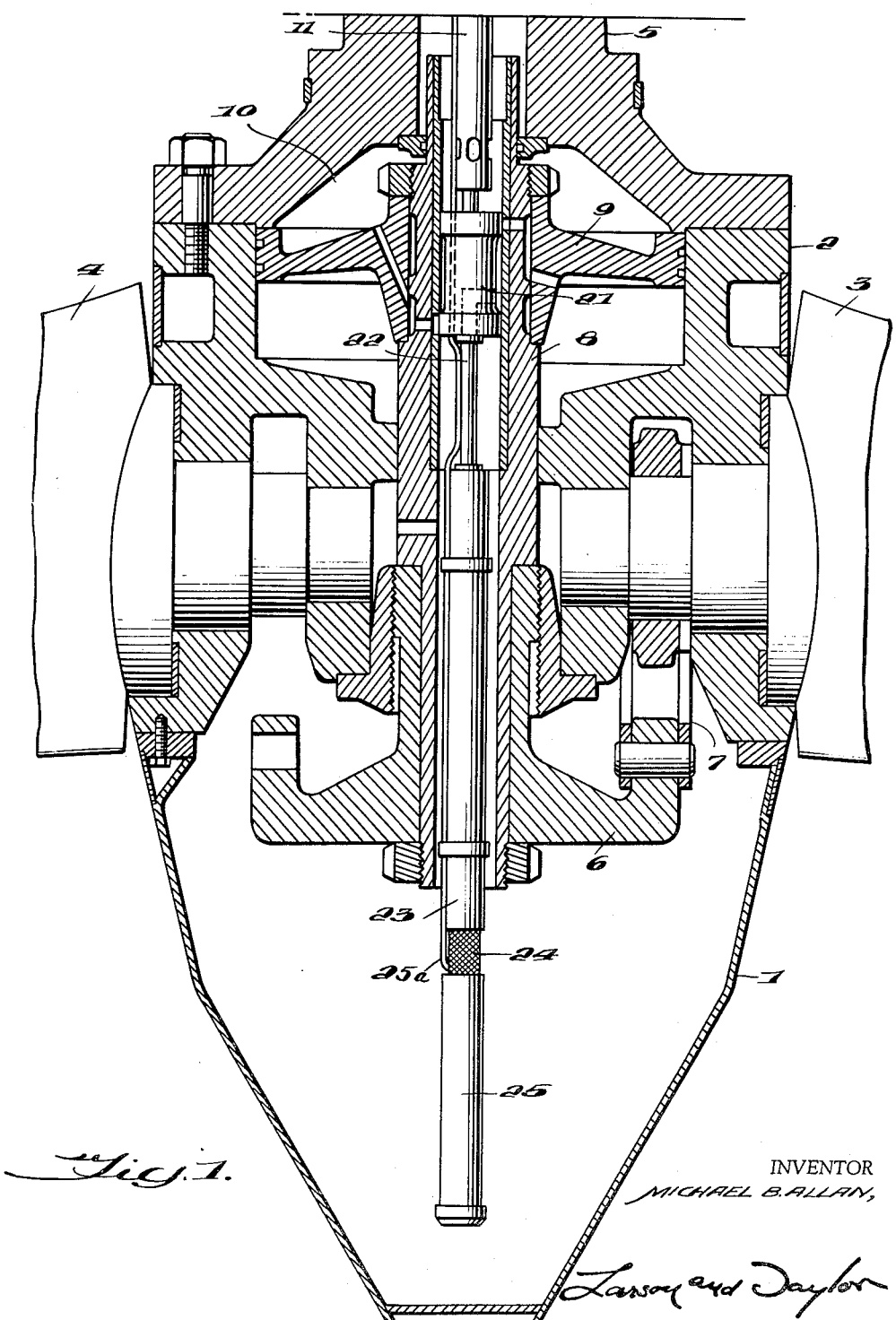

June 23, 1964     M. B. ALLAN     3,138,362
KAPLAN TURBINES
Filed May 23, 1961     3 Sheets-Sheet 1

INVENTOR
MICHAEL B. ALLAN,
Lawson and Taylor
ATTORNEYS

June 23, 1964 M. B. ALLAN 3,138,362
KAPLAN TURBINES
Filed May 23, 1961 3 Sheets-Sheet 2

INVENTOR
MICHAEL B. ALLAN,
Larson and Taylor
ATTORNEYS

United States Patent Office 3,138,362
Patented June 23, 1964

3,138,362
KAPLAN TURBINES
Michael Bingham Allan, Westmount, Montreal, Quebec, Canada, assignor to Dominion Engineering Works Limited, Montreal, Quebec, Canada
Filed May 23, 1961, Ser. No. 111,938
4 Claims. (Cl. 253—31)

This invention relates to hydraulic turbines and pumps and more particularly to a runner blade servo system for Kaplan type turbines wherein the motor and pump for the servo system are housed within the runner blade casing and which may be removed therefrom without dismantling the casing.

In co-pending application Serial No. 108,814 filed May 9, 1961, there is disclosed a conventional Kaplan type turbine runner blade servo system together with an improved system wherein the actuating mechanism for shifting the angular position of the runner blades is housed within the rotating assembly. The advantages of such an improved system in eliminating the piping and rotary seals of conventional Kaplan turbines are adequately brought out in the aforementioned patent application.

It can be appreciated that the motor and pump assembly of the runner blade servo system must be removed for maintenance purposes or replacement after the turbine has been in service. Obviously, it would be highly desirable to be able to remove the pump and motor assembly without unwatering the turbines and without undertaking extensive dismantling of the turbine and generator assembly.

The present invention achieves the foregoing objectives by shaping and sizing the pump and motor assembly so that it will fit through the hollow shaft extending from the generator to the runner blade casing to its normal position within the runner blade casing. By virtue of this construction the motor and pump may be completely removed from the turbine through the hollow shaft thus rendering extensive disassembly of the turbine unnecessary when maintenance of the motor or pump is required.

According to the present invention the rotating assembly of the turbine includes a casing with the runner blades rotatably journalled therein, the rotating assembly including a servo motor operatively connected to the runner blades, a pump and means for driving the pump. The casing itself may constitute the reservoir for the pump. The pump and the means for driving the pump are mounted on the control rod and are of a size such that they may be moved through the hollow shaft extending between the runner blade casing and the generator. Thus the pump and the motor means for driving the pump may be removed from the runner blade casing by removal of the control rod and valve means through the aforementioned hollow shaft.

A primary object of the present invention is to provide in a runner blade servo system disposed within the rotating assembly of a turbine a readily removable pump and motor means.

Another object of the present invention is to provide in a runner blade servo system disposed within the rotating assembly of a turbine a pump and motor means for driving the pump which may be removed through the hollow shaft interconnecting the turbine and generator.

Figure 2:
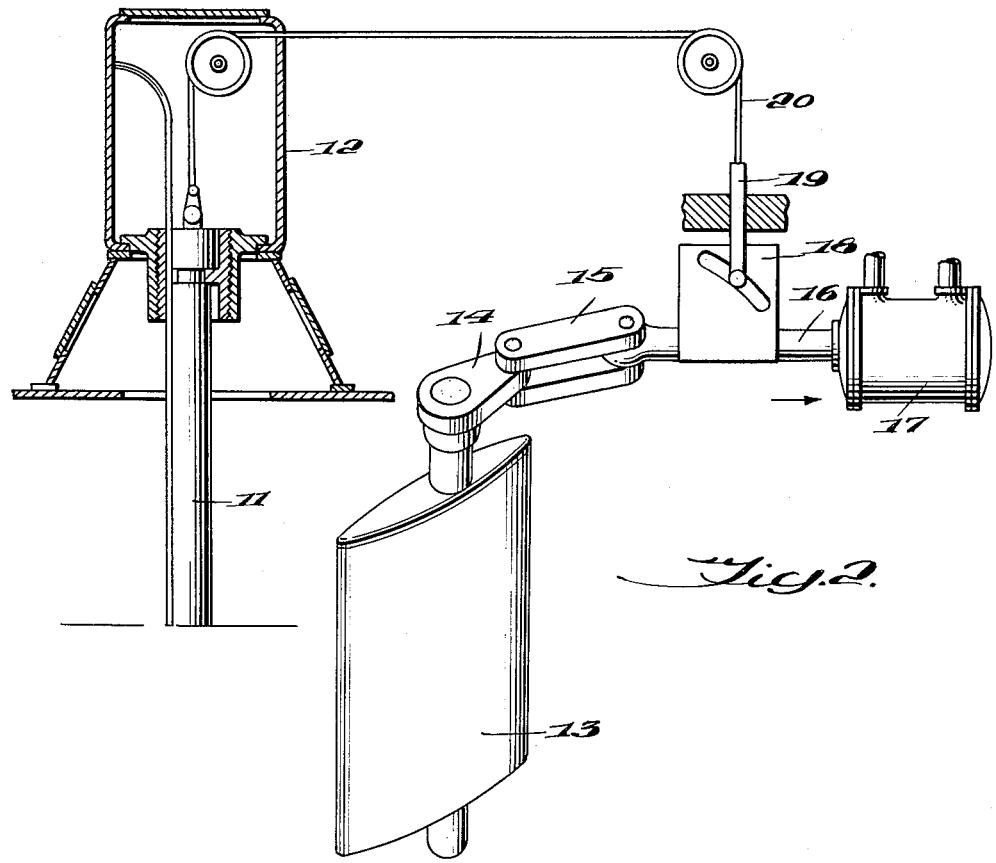
Figure 3:
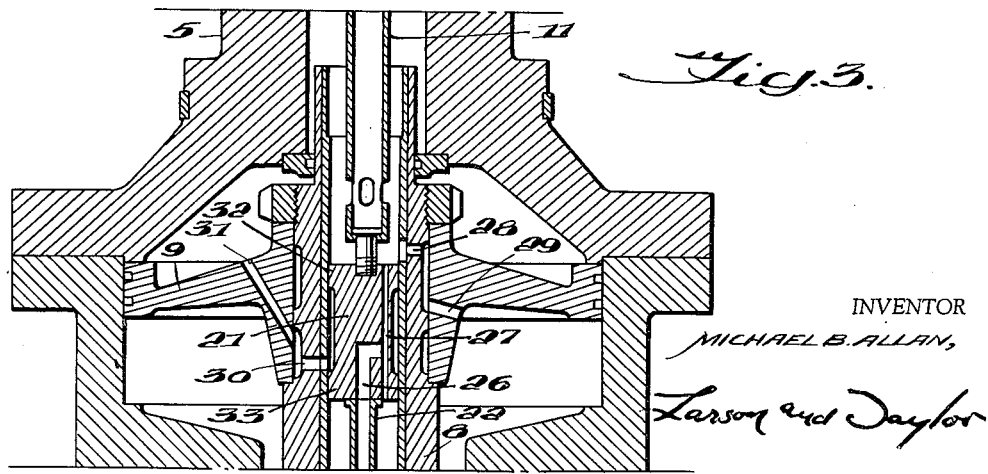
Figure 4:
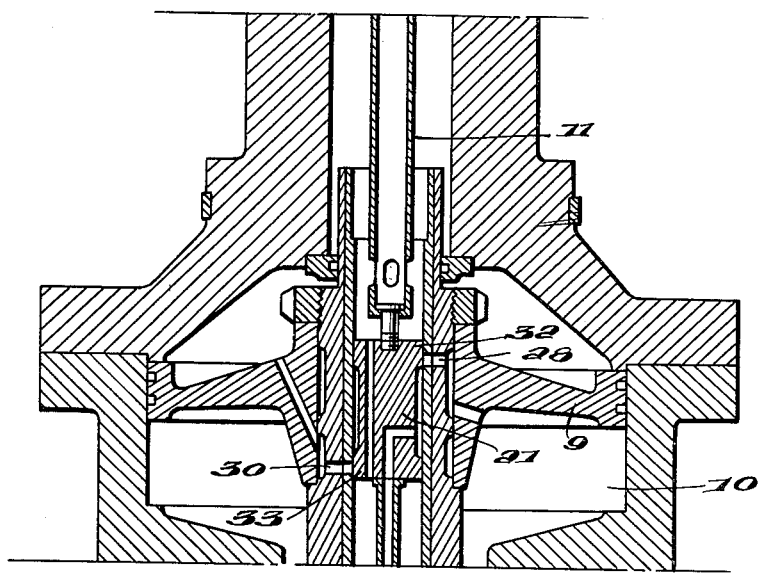
Figure 5:
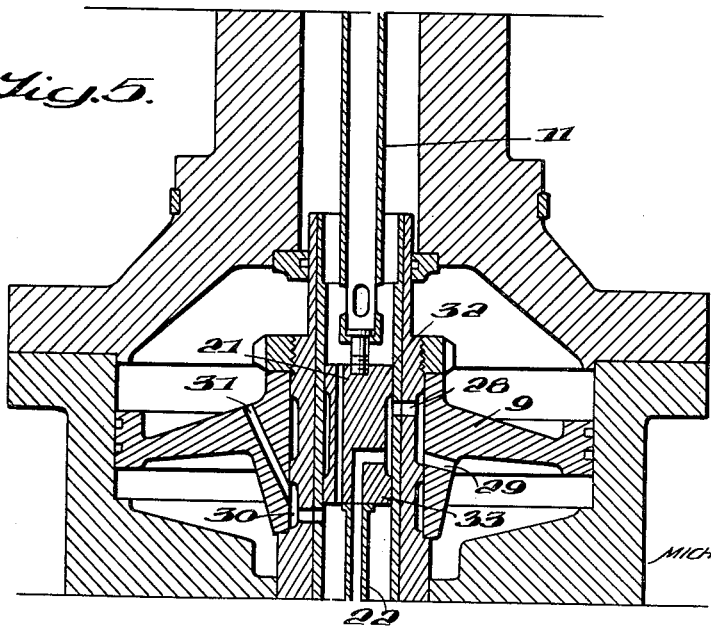

Other objects and many of the attendant advantages of the present invention will become more readily apparent upon consideration of the following detailed specification in connection with the accompanying drawings wherein:

FIG. 1 is an elevational view partly in section of a portion of the runner blade control system according to the present invention, FIG. 2 is a view partly in section of another portion of the runner blade control system, FIG. 3 is a sectional view showing the control valve in position to shift the blade actuating piston downwards to open the blades, FIG. 4 is a sectional view showing the control valve and piston in equilibrium and, FIG. 5 is a sectional view showing the control valve in position to shift the blade actuating piston upwards to close the blades.

Referring now more specifically to the drawings wherein like numerals indicate like parts throughout the several views there is shown at 1 in FIG. 1 a rotatable casing structure including a hub 2, the hub providing means to rotatably journal runner blades 3 and 4. A hollow shaft 5 extends from the rotatable casing and this shaft drives the rotor of a generator (not shown). The runner blades are driven by water fed thereto through a casing (not shown) surrounding the runner blades. A plurality of wicket gates are mounted within this casing and the angular position of these wicket gates is set in accordance with the power demand on the turbine. It has been found that the turbine runs more smoothly and efficiently when the runner blades are set at a specific angular position for each angular position setting of the wicket gates.

The runner blades are rotatably journaled in the hub of the rotatable casing structure and are connected with a crosshead 6 by means of links such as shown at 7 interconnecting runner blade 3 with crosshead 6. The linkage connecting the runner blade 4 with crosshead 6 is not shown for the sake of clarity but it will be understood that each of the runner blades is operatively connected with the crosshead 6 in such a manner that movement of the crosshead along the longitudinal axis of the casing structure 1 will cause simultaneous angular movement of the runner blades.

The crosshead 6 is connected with a piston rod 8 which has the upper end thereof fixed to a piston 9 slidable within cylinder 10. It can be readily appreciated that the piston and crosshead are interconnected so that movement of the piston will produce corresponding movement of the crosshead and hence vary the angular position setting of the runner blades. The piston 9 and cylinder 10 comprise a servo motor controlled by a valve mechanism and rod 11 which extends upwardly through the generator (not shown) to a fixed casing 12, FIG. 2.

In FIG. 2 there is shown a wicket gate 13 which is connected by means of links 14 and 15 with the piston rod 16 of a servo motor 17. The piston rod 16 has mounted thereon a cam 18 and this cam is provided with a cam follower 19 connected with control cable 20 which is secured to the upper end of control rod 11. A suitable power source supplying hydraulic fluid to either end of servo motor 17 drives the piston rod 16 in either direction to determine the angular setting of wicket gate 13. Through the cam and cam follower the control rod 11 will position the valve means so that the runner blades will be shifted to a predetermined position corresponding to the setting of the wicket gates as will appear more clearly hereinafter.

The lower end of the control rod 11 has a spool shaped valve body 21 mounted thereon and a hydraulic pressure pipe 22 interconnects the spool valve with a pump 23. The pump 23 has an inlet 24 as shown and is driven by a motor 25 having current supplied thereto by electric cable 25A. It can be seen that the assembly including the control rod 11, valve 21, hydraulic pressure pipe 22, pump 23 and motor 24 are of a size such that the entire assembly may be removed through the hollow shaft 5 extending between the runner blade casing and the generator.

The spool valve 21 is shown in section in FIG. 3 and it can be seen that the hydraulic pressure pipe 22 communicates with duct 26 within the spool valve. The valve body is provided with a return passageway 27. A port 28 is provided in the piston rod 8 and a duct 29 in the piston 9 interconnects this port with one side of the piston 9. There is further provided in the piston rod 8 a port 30 and this port is connected with the other side of the piston by means of duct 31. The entire casing 1 may constitute a reservoir for the pump 23.

The operation of the presently disclosed system will now be described. In FIG. 4 the parts are shown in an equilibrium position. It can be seen that in this position of the control rod 11 the land 32 on the valve 21 covers port 28 and the land 33 covers port 30. Thus, the hydraulic fluid positioned within the cylinder 10 on both sides of the piston 9 is completely closed off from the oil reservoir and the pump outlet.

When the wicket gates are moved to a more open position the control rod 11 is shifted downwardly as shown in FIG. 3 so that the land 32 uncovers port 28 and interconnects the lower side of the piston 9 through passageway 29 and port 28 with the return passageway 27 to the reservoir. Land 33 uncovers port 30 so that the outlet of the pump 23 is connected through hydraulic pressure pipe 22, duct 26, port 30 and duct 31 with the upper side of the piston 9. Thus the piston will be driven downwardly until the lands 32 and 33 again cover ports 28 and 30, respectively.

In FIG. 5 the position of the valve 21 is shown when the wicket gates are moved to a more closed position. In this position the valve 21 has moved upwardly so that the land 32 has moved upwardly and thus the lower side of the piston 9 is interconnected with the hydraulic pressure pipe 22 and the land 33 has uncovered port 30 so that the upper side of the piston 9 is connected with the oil reservoir. In this position of the parts the piston 9 will be driven upwardly until the lands 32 and 33 again cover ports 28 and 30, respectively.

It can be seen that according to the present invention there is provided a servo mechanism for controlling the runner blades of a turbine wherein the mechanism is completely housed within the rotatable assembly and wherein the pump and motor are of such a size and are so mounted that they may be removed from the rotatable assembly through the hollow shaft interconnecting the runner blade casing and the generator. In the specific embodiment shown the control rod 11, control valve, output pipe of the pump, the pump, and the motor means for driving the pump are mounted on a common axis.

Obviously many modifications and variations of the present invention are possible in light of the above teachings. What is claimed as new and desired to be secured by Letters Patent is:

1. A turbine having an assembly rotatable on a vertical axis including a casing and runner blades adjustably journalled in said casing, means for angularly adjusting the runner blades comprising a pump disposed within said casing, means for driving said pump, a servo motor disposed within said casing, said servo motor being operatively connected with the output of said pump, means connecting the runner blades with the servo motor whereby the angular position of the runner blades is shifted by actuation of the servo motor, and a hollow shaft extending vertically upwardly from said casing, said pump and said means for driving said pump being removable from said casing by drawing the pump and drive means vertically upwardly through said hollow shaft.

2. A turbine comprising wicket gates and runner blades, means for angularly adjusting said runner blades in predetermined relation and in response to angular positioning of the wicket gates, a casing for mounting said runner blades for angular adjustment, said casing being rotatable on a vertical axis, a pump and servo motor means operatively interconnected with said runner blades disposed in said casing for angularly positioning said runner blades, a reservoir constituting said casing for supplying fluid for the pump for driving said servo motor, and a hollow shaft extending vertically upwardly interconnecting the casing with a generator, said pump being removable from said casing by drawing the pump vertically upwardly through said hollow shaft.

3. In a Kaplan type turbine adjustable wicket gates and wicket gate operating mechanism for changing the setting of the wicket gates to control the flow of water to the runner blades of the turbine, a rotating assembly including a vertical rotatable shaft, a casing rigidly secured to said shaft, a liquid reservoir, runner blades journalled in said casing for rotation about axes radial to the casing, a hydraulic servo motor operatively connected to said blades for changing and controlling their orientating about said radial axes, a pump having an inlet through which liquid is drawn into said pump from said reservoir, a valve through which the liquid is delivered from said pump to said servo motor, valve operating mechanism interconnecting said valve and said wicket gate operating mechanism, said servo motor, pump and valve being positioned within said casing, and having a common longitudinal axis, a hollow shaft extending vertically upwardly from said casing, said pump being removable by drawing the pump upwardly through said hollow shaft.

4. In a Kaplan type turbine including adjustable wicket gates and wicket gate operating mechanism for changing the settings of the wicket gates to control the flow of water to the runner blades of the turbine, a rotating assembly including a hollow vertically extending rotatable shaft, a casing rigidly secured to said shaft, a liquid reservoir disposed within said casing, runner blades journalled in said casing for rotation about axes radial to the casing, and means for shifting the orientation of said runner blades about said axes in response to change in the position of said wicket gates, said means being disposed in said casing and comprising a hydraulic servo motor operatively connected to said blades for changing and controlling the pitch setting, a pump having an inlet through which liquid is drawn into said pump from said reservoir, a valve through which the liquid is delivered from said pump to said servo motor, valve operating mechanism interconnecting said valve and said wicket gate operating mechanism, means for driving said pump, said pump and said means for driving the pump having a common longitudinal axis and being removable by drawing the same vertically upwardly through said hollow rotatable shaft.

References Cited in the file of this patent

UNITED STATES PATENTS

| 2,518,925 | Nussbaum | Aug. 15, 1950 |
| 2,739,252 | Patterson et al. | Mar. 20, 1956 |
| 3,004,609 | Naulty | Oct. 17, 1961 |

FOREIGN PATENTS

| 193,324 | Austria | Nov. 25, 1957 |
| 703,319 | Germany | Mar. 6, 1941 |
| 757,575 | Great Britain | Sept. 19, 1956 |